United States Patent
Pepin et al.

(10) Patent No.: US 7,295,549 B2
(45) Date of Patent: Nov. 13, 2007

(54) SOURCE AND CHANNEL RATE ADAPTATION FOR VOIP

(75) Inventors: Christine Pepin, Menlo Park, CA (US); Johnny Matta, San Jose, CA (US); Khosrow Lashkari, Fremont, CA (US); Ravi Jain, Mountain View, CA (US)

(73) Assignee: NTT DoCoMo, Inc., Tokyo (JP)

(*) Notice: Subject to any disclaimer, the term of this patent is extended or adjusted under 35 U.S.C. 154(b) by 980 days.

(21) Appl. No.: 10/366,944

(22) Filed: Feb. 14, 2003

(65) Prior Publication Data
US 2004/0160979 A1  Aug. 19, 2004

(51) Int. Cl.
*H04L 12/56* (2006.01)
(52) U.S. Cl. .................. 370/352; 370/356
(58) Field of Classification Search .............. 370/352, 370/356
See application file for complete search history.

(56) References Cited

U.S. PATENT DOCUMENTS

| | | | |
|---|---|---|---|
| 6,349,197 B1 * | 2/2002 | Oestreich | 455/63.1 |
| 6,577,648 B1 * | 6/2003 | Raisanen et al. | 370/503 |
| 6,646,995 B1 * | 11/2003 | Le Strat et al. | 370/252 |
| 2005/0254508 A1 * | 11/2005 | Aksu et al. | 370/428 |
| 2006/0069553 A1 * | 3/2006 | Hakansson et al. | 704/222 |

OTHER PUBLICATIONS

J. Matta, "CATprobe: A tool to estimate congestion and available bandwidth in IP networks", DoCoMo USA Labs Internal Technical Report, Jun. 2002.

ITU-T Recommendation G.107, "The Emodel, a computational model for use in transmission planning", Jul. 2002.

N. Kitawaki and K. Itoh, "Pure delay effects on speech quality in telecommunications", IEEE Journal on Selected Areas in Communications, vol. 9, No. 4, May 1991.

A. Markopoulou, F. Tobagi, M. Karam, "Assessment of VoIP quality over Internet Backbones", IEEE Infocom, Aug. 2002.

ITU-T Recommendation G.108, "Application of the Emodel: A planning guide", Sep. 1998.

Y. Liang, N. Farber, B. Girod, "Adaptive playout scheduling using time-scale modification in packet voice communications", Proc. Of ICASSP 2001.

J. Rosenberg, L. Qiu, H. Schulzrinne, "Integrating packet FEC into adaptive voice playout buffer algorithms on the Internet", Proc. of Infocom 2000.

(Continued)

*Primary Examiner*—Melvin Marcelo
(74) *Attorney, Agent, or Firm*—Blakely, Sokoloff, Taylor & Zafman LLP

(57) ABSTRACT

A coding system and method for a terminal including a multi-rate codec is disclosed. The terminal includes a multi-rate adaptive coder that is capable of transmitting a continuous voice stream transmission at a source code bit rate and a channel code bit rate. A quality of service probing module probes an end-to-end network path of the continuous voice stream transmission to obtain at least one quality of service parameter. A quality of service management module determines at least one constraint associated with the continuous voice stream transmission. An adaptive bit rate algorithm module dynamically adjusts the source code bit rate and the channel code bit rate as a function of the quality of service parameter and the constraint to obtain a maximum value of perceived user performance during the continuous voice stream transmission.

78 Claims, 14 Drawing Sheets

OTHER PUBLICATIONS

J. Matta, "Relating packet losses on the wired and wireless hops to end-to-end path packet loss in IP networks", Draft, Oct. 2002.

R.G. Cole, J.H. Rosenbluth, "Voice over IP performance monitoring", In Proceedings of ACM SIGCOMM 2001.

J. W. Seo, S. J. Woo, K.S.Bae, "A study on the application of an AMR speech codec to VoIP".

3rd Generation Partnership Project; Technical Specification Group Services and System Aspects; Mandatory Speech Codec speech processing functions AMR speech codec; Transcoding functions (3G TS 26.090 version 1.1.0).

J.-C. Bolot, A. Vega Garcia, "Control mechanisms for packet audio in the Internet", Proc. IEEE Infocom 1996.

J.-C. Bolot, S. Fosse-Parisis, D. Towsley, "Adaptive FEC-based error control for Internet telephony", Proc. IEEE Infocom 1999, Mar. 1999, New York, NY.

T. Yoshimura, T. Ohya, T. Kawahara, M. Etoh, "Rate and robustness control with RTP monitoring agent for mobile multimedia streaming", Proc. of ICC 2002, Apr. 28-May 2, 2002, New York, NY.

C. Perkins et al. "RTP payload for redundant audio data", RFC 2198, Sep. 1997.

S. Lin, D. Costello, Error Control Coding: Fundamentals and Applications, Prentice-Hall, Inc., Englewood Cliffs, NJ 07632, 1983, pp. 170-177.

J. Sjoberg et al., "Real-time transport protocol (RTP) payload format and file storage format for the adaptive multi-rate (AMR) and adaptive multi-rate wideband (AMR-WB) audio codecs", RFC 3267, Jun. 2002.

M. Karam, F. Tobaji, "Analysis of the delay and jitter of voice traffic over the Internet", Jul. 2001.

Genista Corporation, "3G Voice Service Quality, Objective Characterization of WCDMA Voice Quality", 2001.

ITU-T P.862 "Perceptual evaluation fo speech quality (PESQ), an objective method for end-to-end speech quality assessment of narrowband telephone networks and speech codecs," Feb. 2001.

W. Jiang and H. Schulzrinne, "Comparison and optimization of packet loss repair methods on VoIP perceived quality under bursty loss," Proc. of NOSSDAV 2002, May 12-14, 2002, Miami Beach, FL, USA.

M. Kaindl and N. Goortz, "AMR voice transmission over mobile Internet," Proc. of IEEE ISCASSP, 2002, Orlando, FL.

Boutremans, C., LeBoudec, J.Y., "Adaptive Delay Aware Error Control for Internet Telephony," EPFL, Lausanne, Switzerland, 2nd IP Telephony Workshop, Columbia University, New York, New York, Apr. 2001.

Boutremans, C., LeBoudec, J.Y., "Adaptive Joint Playout Buffer and FEC Adjustment for Internet Telephony," EPFL, Lausanne, Switzerland, Technical Report IC/2002/035, May, 2002.

* cited by examiner

| MODE INDEX | BIT RATES (kbps) | CLASS A | CLASS B | CLASS C | TOTAL # bits |
|---|---|---|---|---|---|
| 1 | 4.75 | 42 | 53 | 0 | 95 |
| 2 | 5.15 | 49 | 54 | 0 | 103 |
| 3 | 5.90 | 55 | 63 | 0 | 118 |
| 4 | 6.70 | 58 | 76 | 0 | 134 |
| 5 | 7.40 | 61 | 87 | 0 | 148 |
| 6 | 7.95 | 75 | 84 | 0 | 159 |
| 7 | 10.2 | 65 | 99 | 40 | 204 |
| 8 | 12.2 | 81 | 103 | 60 | 244 |

| R-FACTOR | QUALITY OF VOICE RATING | MOS |
|---|---|---|
| 90<R<100 | BEST | 4.34-4.50 |
| 80<R<90 | HIGH | 4.03-4.34 |
| 70<R<80 | MEDIUM | 3.60-4.03 |
| 60<R<70 | LOW | 3.10-3.60 |
| 50<R<60 | POOR | 2.58-3.10 |

| | n | k | MODE | $I_d$ | $I_e$ | AIBw (kbps) | $P_s$ (%) |
|---|---|---|---|---|---|---|---|
| A | 4 | 1 | 8 | 3.7 | 30.3 | ≤60 | 0.16 |
| B | 3 | 1 | 8 | 3.6 | 30.9 | 40 | 0.80 |
| C | 3 | 1 | 6 | 3.2 | 32.6 | 30 | 0.80 |
| D | 5 | 2 | 6 | 4.7 | 32.5 | 20 | 0.54 |
| E | 5 | 2 | 1 | 4.6 | 36.9 | 12.2 | 0.54 |
| F | 4 | 2 | 1 | 4.5 | 39.2 | 10 | 2.08 |

| | n | k | MODE | $I_d$ | $I_e$ | AIBw (kbps) | $P_s$ (%) |
|---|---|---|---|---|---|---|---|
| G | 2 | 1 | 8 | 3.5 | 30.15 | 26 | 0.01 |
| H | 2 | 1 | 8 | 3.5 | 30.6 | 26 | 0.49 |
| I | 2 | 1 | 8 | 3.5 | 31.2 | 26 | 1.21 |
| J | 2 | 1 | 8 | 3.5 | 31.6 | 26 | 1.69 |
| K | 3 | 1 | 6 | 3.2 | 32.5 | 26 | 0.49 |
| L | 3 | 1 | 6 | 3.2 | 32.6 | 26 | 0.80 |

SOURCE AND CHANNEL RATE ADAPTATION FOR VOIP

BACKGROUND OF THE INVENTION

1. Technical Field

The present invention relates generally to source and channel coding for speech codecs and more particularly, to a method and system for providing an optimal choice of source and channel code bit rates given information on the packet loss and available bandwidth of a IP access network.

2. Related Art

Existing speech coders were not designed for use over IP packet networks. A packet switched network is a shared medium designed for asynchronous transmission on a best effort basis. In IP networks the available bandwidth and delay vary over time. Time-critical applications such as voice and video have traditionally assumed guaranteed bandwidth, delay and synchronous transmission. Most of the speech coders operate under preset schemes for data and channel code rates making them vulnerable to the varying conditions on wired and wireless IP-based hops. Some kind of adaptation is therefore needed to dynamically adapt the codec bit rate to quickly changing network conditions to preserve acceptable levels of reliability and quality.

Several types of degradations occur in IP networks, among them: 1) packet loss due to network congestion resulting from a lack of available bandwidth, 2) packet loss due to the network jitter, 3) delay due to packetization, 4) delay due to congestion, and 5) packet loss due to random or bursty communication noise. The first four degradations are prominent in the wired IP networks while the last one occurs primarily in wireless networks and is due to residual bit errors at the link layer. The retransmission mechanism used in the TCP protocol for error control cannot be used due to its inherent delay that might be unacceptable for real-time, interactive voice applications.

Codec rate adaptation is an effective method to cope with network congestion and mitigate the effects of packet loss. The European Telecommunication Standards Institute/3rd Generation Partnership Project ("ETSI/3GPP") adaptive multi-rate (AMR) speech codec is suitable for this purpose. In some systems, the packet loss is reduced by dividing the network conditions into eight states and assigning each state to one of the eight bit rates of the AMR codec. Network conditions are monitored using the difference in timestamps between successive speech frames at the receiving side (i.e., the system monitors the network jitter). The results show a drastic reduction in packet loss rate when compared to fixed-rate codecs such as G.711 and G.723.1.

In some situations, reducing the source bit rate alone does not help. Such situations may be short-term transient congestion, congestion caused by others' traffic or residual bit errors caused by a noisy wireless link. Channel coding—or forward error correction (FEC)—can then be used in conjunction with an error control scheme to optimally allocate the amount of redundant bits and information bits in response to varying channel conditions (available bandwidth, loss rate, delay, etc.)

Others have proposed a flexible scheme for voice transmission over the mobile Internet in which the AMR codec is combined with a systematic convolutional code of rate 1/n. The packetization scheme is done according to the optimal puncturing patterns of the code, that is, all bits stemming from the same generator polynomial are put into the same packet. Hence, one media packet is followed by n−1 forward error correction (FEC) packets. Packet loss is assumed as puncturing of the convolutional code for which decoding methods are known. The code reduces both random packet loss in the wired IP network and random bit errors on the wireless link (similar to a physical layer FEC code). Although the authors mention that appropriate feedback can adaptively control the amount of source and channel bits, they do not implement any rate adaptation scheme.

Another solution proposes using redundant audio coding to deliver decent audio quality to a destination. In this scheme, an audio packet includes the encoded main information as well as a highly compressed version of previous packets (the redundant information). For instance, packet n includes in addition to the PCM encoded samples LPC or GSM versions of packets n−1 and n−2. The perceived loss rate is used as the metric and gradually changes the amount of redundancy according to a fixed threshold (e.g., 3% packet loss rate). Loss rates are sent back to the encoders using RTCP reports. However, this algorithm suffers from several shortcomings, such as a cyclical behavior (increasing and decreasing the redundancy continuously although the network loss rate is near constant) that results in poor performance.

In a modification of the above-referenced approach, the problem is stated as a constrained optimization one: given the available bandwidth, what is the combination of main and redundant information which provides the best perceived audio quality? This approach still uses redundant audio coding, but also tries to optimize a subjective measure of quality taking into account the rate and delay constraints. In this approach, it is found that the main information should be encoded using the highest quality coder and copies located towards the end should be encoded with the next highest quality coders. The available bandwidth and loss rate are obtained using TCP-friendly rate control and RTCP feedback, respectively.

The need to distinguish network congestion from bit errors on radio links serves as a basis for a new quality of service (QoS) control architecture, in an article entitled "Rate and robustness control with RTP monitoring agent for mobile multimedia streaming,". In this paper, a new type of proxy is introduced called "RTP monitoring agent" located at the edge of the wired network and wireless link. The RTP monitoring agent sends feedback reports about the wired network conditions such as jitter, loss, etc. to the media server. The latter also receives RTCP reports from the media receiver containing statistics about both the wired and the wireless networks. The media server is then able to apply the appropriate strategy depending on whether packet losses are due to network congestion (reduce the encoder bit rate) or radio link errors (increase robustness by adding more FEC). The adaptation algorithm consists of pre-defined combinations targeted to make the total packet loss rate less than 1%.

SUMMARY

The present invention discloses a fixed or wireless terminal having adaptive coder bit rates that are capable of being adjusting during operation to achieve a maximum user perceived performance. The terminal or a network includes a multi-rate adaptive coder capable of transmitting a voice stream transmission that includes a source code bit rate and a channel code bit rate. A quality of service probing module is also included on the terminal that is operable to probe an end-to-end network path of the voice stream transmission to obtain at least one quality of service parameter. The terminal also includes a quality of service management module that is programmed to determine at least one constraint that is associated with the voice stream transmission. An adaptive bit rate algorithm module is programmed to jointly adjust the source code bit rate and the channel code bit rate as a function of the quality of service parameter and the constraint to obtain a maximum value of perceived user performance during the voice stream transmission.

The adaptive bit rate algorithm module computes a maximum number of media symbols (k) in a codeword, a maximum length of the codeword (n), an end-to-end network delay, a delay impairment factor, a measured packet loss factor, a signal distortion factor and an R-factor to compute a mean opinion score (MOS). The mean opinion score is used to adjust the source code bit rate and the channel code bit rate. The mean opinion score (MOS) is determined for a plurality of combinations of source and channel code bit rate values. The source code bit rate and the channel code bit rate that are chosen for the voice stream transmission are the ones that achieve the highest mean opinion score for a give source code bit rate.

The present invention also discloses a method of providing adaptive coder rates to a terminal. One preferred method comprises the steps of (a) providing a multi-rate adaptive coder capable of transmitting a voice stream transmission that includes a source code bit rate and a channel code bit rate; (b) probing an end-to-end network path of the voice stream transmission to obtain at least one quality of service parameter; (c) determining at least one constraint associated with the voice stream transmission; and (d) adapting the source code bit rate and the channel code bit rate as a function of the quality of service parameter and the constraint to obtain a maximum value of perceived user performance during the voice stream transmission.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
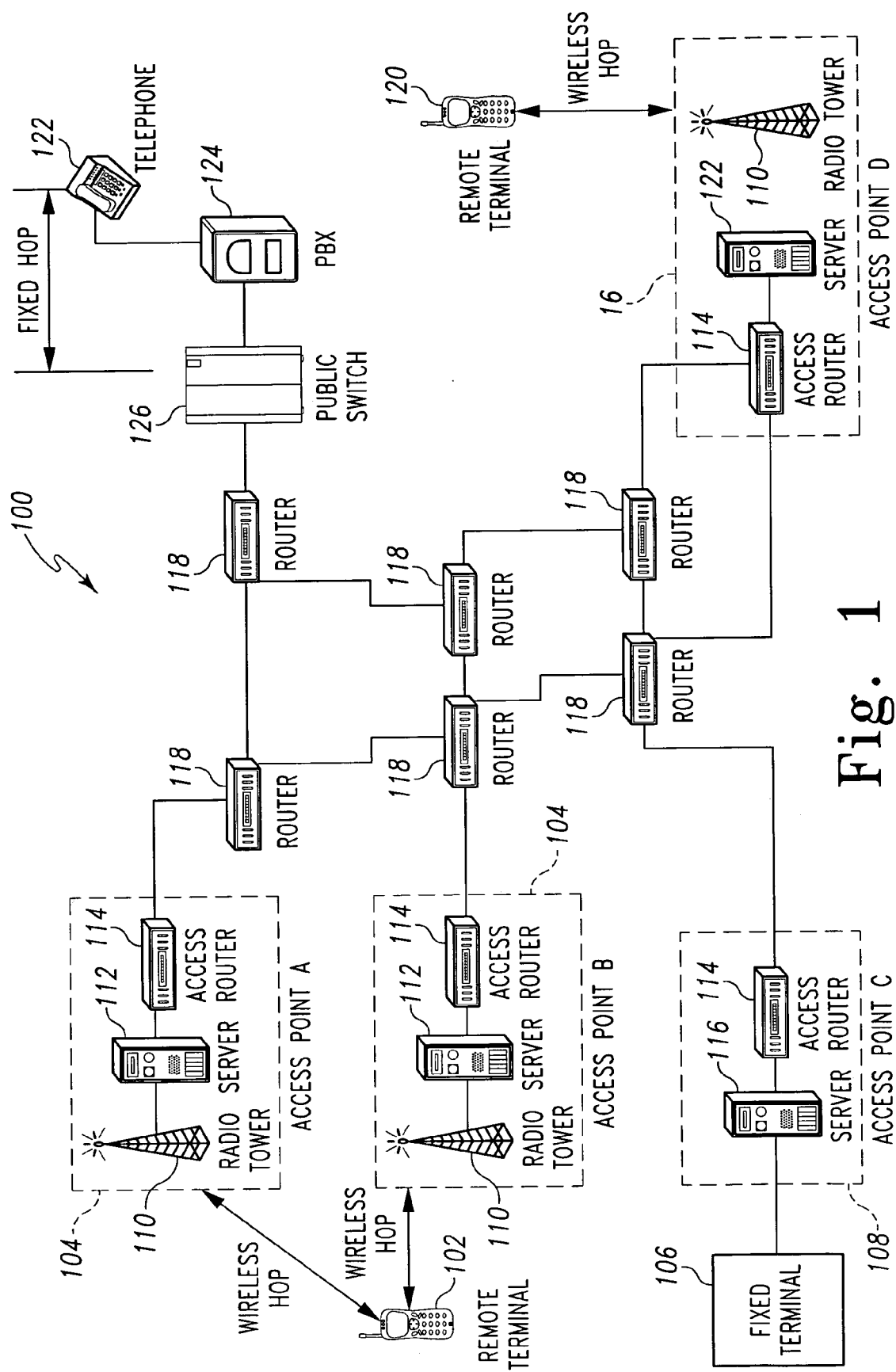
FIG. 1 illustrates an exemplary IP access network.
Figure 2:
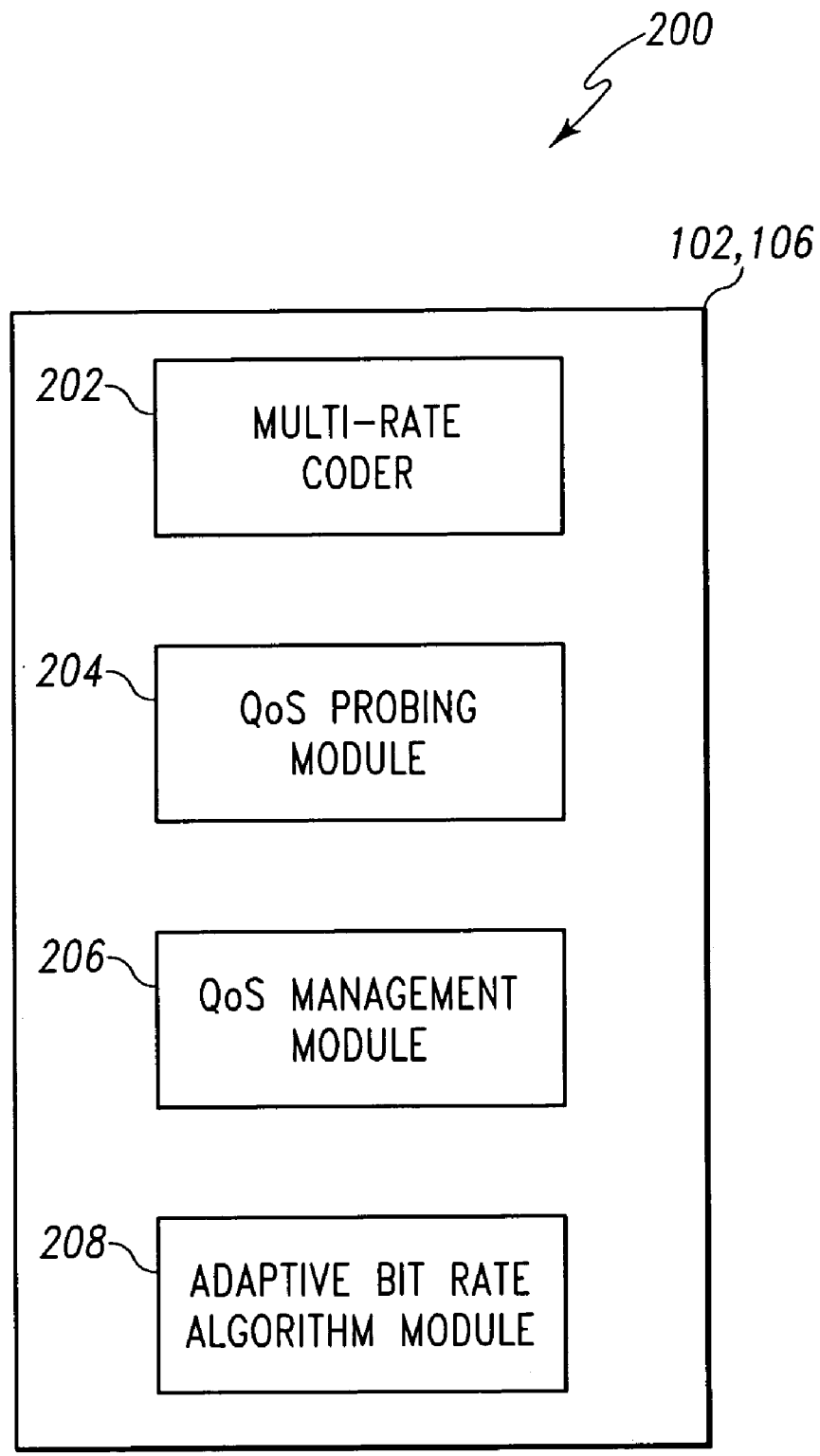
FIG. 2 illustrates a coding system for an origination node or terminal.

Referring collectively to FIGS. 1 and 2, the present invention discloses a coding system 200 for use in an access network 100, which is preferentially an IP access network. The coding system 200 includes an adaptive bit rate algorithm module 208 that jointly establishes a source and channel code bit rate to provide optimal Quality of Service ("QoS") during a voice-over-IP ("VoIP") session using the access network 100. The coding system 200 could also be used with various types of real-time media applications. The coding system 200 determines and uses the optimal choice of source and channel bit rates given information on the packet loss and available bandwidth of the access network 100. Multi-rate speech codecs or coders are used with the coding system 200, such as the adaptive-multi-rate (AMR). For the purpose of the present invention, the term access network 100 should be broadly construed as a wired access network or a wireless access network, unless otherwise specified.

Referring to FIG. 1, the wireless access network 100 includes a wireless source node or terminal 102 that is connected to a wireless access point 104. The connection between the wireless terminal 102 and the wireless access point 104 may be referred to as a wireless hop. In the case of a wired access network 100, a fixed source node or terminal 106 may be connected to an access point 108. The fixed terminal 106 may be a telephone or various types of computing devices, such as a personal computer, laptop or personal digital assistant (PDA). The wireless access point 104 includes a base station 110 that may be connected to a wireless access point server 112. In turn, the wireless access point server 112 may be connected to a router 114.

The fixed access network 108 includes a server 116 that is connected with a respective router 114. The connection between the fixed terminal 106 and the fixed access network 108 may be referred to as a fixed hop. The routers 114 of the wireless access point 104 and the fixed access point 108 may be connected with a plurality of network routers 118 that establish a connection between the source nodes or terminals 102, 106 and either a wireless destination node or terminal 120 or a fixed destination node or terminal 122. As such, during operation a connection is established between the source terminals 102, 106 and the destination terminals 120, 122.

As further illustrated in FIG. 1, the fixed destination terminal 122 may be connected with a PBX 124, which in turn, may be connected with a public switch 126. The public switch 126 may be connected with a respective network router 118. The fixed terminal 122 may be a computing device, such as a personal computer, laptop computer or an IP telephone, which is connected with a respective network router 118. The wireless destination terminal 120 may be connected to a respective wireless access point 104 that includes a server 112 and a router 114. Those skilled in the art should recognize that other connection arrangements and devices may be used in both wired and wireless packet based networks and that these components may be used by the present invention to establish a connection between the source terminals 102, 106 and the destination terminals 120, 122. It is important to note that the purpose of the IP access network 100 is to establish an end-to-end network connection between the source terminals 102, 106 and the destination terminals 120, 122.

Referring to FIG. 2, the preferred coding system 200 may be located on the source nodes or terminals 102, 106. The coding system 200 includes a multi-rate adaptive codec or coder 202 that is capable of generating and transmitting a continuous voice stream transmission at a respective source code bit rate and a respective channel code bit rate. A quality of service (QoS) probing module 204 may also be included for probing an end-to-end network path of the continuous voice stream transmission to obtain at least one quality of service parameter. The coding system 200 may also include a quality of service (QoS) management module 206 for determining at least one constraint associated with the continuous voice stream transmission. An adaptive bit rate algorithm module 208 may also be included for dynamically adjusting the source code bit rate and the channel code bit rate during operation. The source code bit rate and the channel code bit rate are preferentially adjusted as a function of the quality of service parameter and the constraint to obtain a maximum value of perceived user performance during the continuous voice stream transmission.

Figure 3:
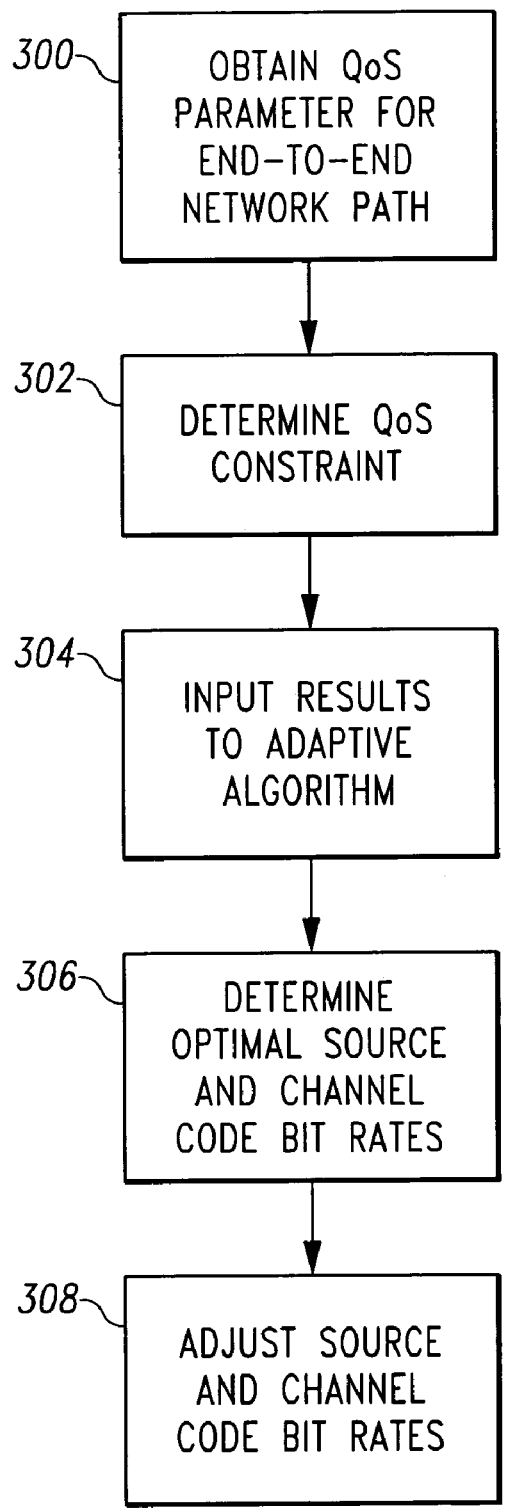
FIG. 3 is a flow chart illustrating the process steps accomplished by the coding system.

Referring to FIG. 3, during operation the quality of service (QoS) probing module 204 probes the end-to-end transmission path of the source terminals 102, 106 to obtain at least one quality of service (QoS) parameter, which is represented at step 300. Once the quality of service parameter (QoS) has been obtained, at step 302 the coding system 200 uses the quality of service management module 206 to determine at least one constraint that is associated with the continuous voice stream transmission. After this information is obtained, it is provided as inputs to the adaptive bit rate algorithm module 208, which is illustrated as step 304. As set forth in greater detail below, the inputs are used by algorithms in the adaptive bit rate algorithm module 208 to determine the optimal source and channel code bit rates for the multi-rate coder 202, which is represented at step 306. After the optimal source and channel code bit rates are determined, the adaptive bit rate algorithm module 208 sets the source and channel code bit rates to the determined optimal values that achieve the best user perceived performance, which is illustrated at step 308.

In the preferred embodiment of the present invention, the source terminals 102, 106 use an adaptive multi-rate (AMR) speech codec or coder 202 to transmit voice data to the destination terminals 120, 122. The AMR speech codec is a variable rate speech codec that may be used in W-CDMA communication. As set forth above, the AMR speech codec was developed by the ETSI and adopted by the 3GPP for use in VoIP communication.

The coding scheme used is the algebraic code excited linear prediction (ACELP) coder. Voice activity detection, comfort noise generation, source controlled rate operation and error concealment of lost frames are also provided in the specifications. Referring to FIG. 2, the multi-rate codec has eight encoding modes corresponding to eight source bit rates ($R_s$) ranging from 4.75 kbps to 12.2 kbps. The AMR speech codec is adaptive in the sense that it can switch its bit rate every 20 ms of speech frame depending upon channel and network conditions. Although not illustrated, at the output of the encoder used by the source terminals 102, 106, bits are ordered according to their subjective importance and further divided into three classes with decreasing perceptual importance: Class A, Class B, and Class C. The number of bits per class is set forth in FIG. 4 as it relates to the AMR speech codec.

Figures 4, 5:
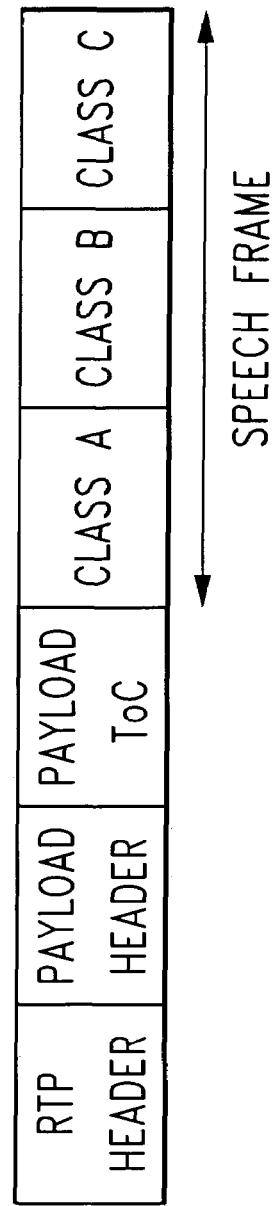
FIG. 4 sets forth encoding modes used in the speech codec.
FIG. 5 illustrates a real-time transport protocol (RTP) payload format for the speech codec.

In the present invention, the three classes are subject to the same level of error protection. Preferentially, the real-time transport protocol (RTP) is used over the IP access network 100. RFC 3267 defines the RTP payload format for the AMR speech codec. The structure of the preferred RTP payload format is shown in FIG. 5 for one speech frame per packet. Other payload formats could be used in the present invention and the use of an RTP payload format should not be construed as a limitation of the present invention.

Figures 6, 7:
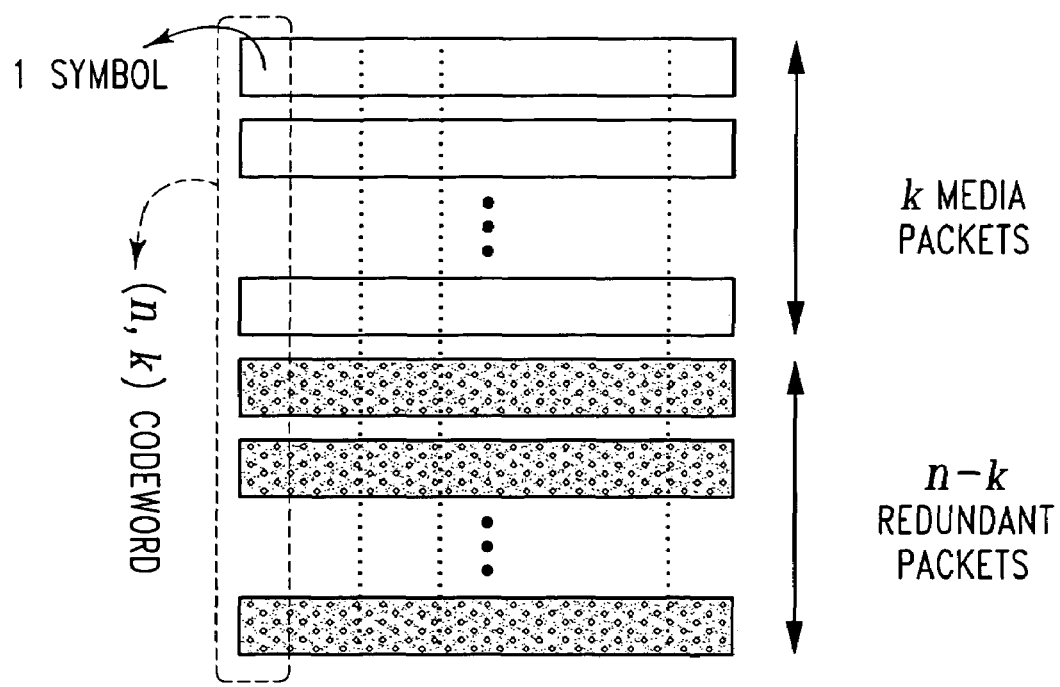
FIG. 6 illustrates packet erasure coding in Reed-Solomon codes.
FIG. 7 illustrates a comparison of R-Factor (R) and mean opinion score (MOS) scales and the corresponding voice quality rating.

Referring to FIG. 6, the present coding system may also use Reed-Solomon ("RS") codes in the transmission of data packets to the destination terminals 120, 122. RS codes are a special class of non-binary linear block codes called "erasure codes." RS codes offer good erasure protection and efficient decoding algorithms make it possible to implement relatively long codes in many practical applications. A (n, k') RS code defined over the Galois Field (GF ($2^q$)) is described by the following parameters: the block length n is equal to $2^q-1$, the number of information symbols encoded into a block of n symbols is k'=1, 2, . . . , n−1, and the code rate is k'/n. The code is guaranteed to correct up to n-k' erasures. For the purpose of the present invention, consider q=8 so that eight information bits (one byte) are mapped into one of the 256 symbols. A systematic (n, k') block code consists of k' information symbols followed by n-k' redundant symbols. A (255, k') RS code can be shortened to a (255-m, k'-m) RS code to accommodate a given application.

In the present invention, redundancy is spread across packets in the manner set forth below. Each media packet can be seen as consisting of several symbols, each symbol being an element of GF($2^8$). A group of k symbols from k different media packets is used to generate n-k redundant symbols, creating a length n codeword. These redundant symbols are then placed in separate packets as shown in FIG. 6. In this way, a systematic block code consisting of n packets is generated from k media packets.

To assess the tradeoff between source and channel bit or code rates ($R_s$ and $R_c$, respectively), the present invention relates these and other QoS factors, such as packet loss and available bandwidth, to a criterion that can be used as a basis of comparison. One such criterion may be based on the Emodel. The Emodel is a computational model standardized by the ITU-T in 1998 that combines the effects of variations in several transmission parameters to predict the subjective conversational quality of 3.1 kHz handset telephony. The output of the Emodel is a scalar quantity rating value or R-Factor (R), on a scale of 0 to 100, where R=0 represents an extremely bad quality and R=100 represents a very high quality. The difference between a mean opinion score (MOS) and the R-Factor (R) scores is that the former is based on real subjective ratings of a large number of voice calls by a large set of people, whereas the latter is an analytical estimate of the subjective score.

The mean opinion score (MOS) is used to refer to the quality of a digitized voice line, as defined by the ITU-T P.800. The mean opinion score (MOS) is an average of the numbers for a particular codec. It is derived from an evaluation of various pre-selected voice samples over different transmission media, replayed under controlled conditions, to a statistically valid mixed group of men and women who assign a quality rating, or quality score, to the evaluated selection. Scores range from 1 to 5 and a score of 4.0 or higher is considered toll quality. A score of 1 is equated with bad (quality of speech—no meaning understood), a score of 2 is equated with poor (quality of speech—considerable effort), a score of 3 is equated with fair (quality of speech—moderate effort), a score of 4 is equated with good (quality of speech—attention necessary) and a score of 5 is equated with excellent (quality of speech—complete relaxation).

Objective tests, such as the perceptual speech quality measure (PSQM) and the perceptual evaluation of speech quality (PESQ), offer fast alternatives to subject testing. Although correlations between PESQ scores and ITU-T database subjective mean opinion score (MOS) results are around 93 percent, the objective metric does not provide a comprehensive evaluation of transmission quality. It only measures the effects of one-way speech distortion and noise on speech quality. The effects of loudness loss, delay, echo and other impairments related to two-way interaction are not reflected in the PESQ scores. On the other hand, these impairments are taken into consideration in the Emodel. As such, the coding system uses the R-Factor (R) as a measure of speech quality.

The Emodel is defined as follows:

$$R = R_o - I_S - I_d - I_e + A \quad (1)$$

where $R_o$ incorporates the effect of noise, $I_S$ accounts for quantization, $I_d$ represents the effect of delay, and $I_e$ captures the effect of signal distortion due to low bit rate codecs—the "equipment impairment factor"—as well as packet losses of random distribution. The advantage factor A captures the fact that some users might be willing to accept a reduction in quality in return for service convenience, such as cellular or satellite phones.

Measured delay can be mapped into the effect of delay ($I_d$) and packet loss into the effect of signal distortion ($I_e$). The effect of noise ($R_o$) and the account for quantization ($I_S$) do not depend on network performance and are inherent to the voice signal itself. The R-Factor (R) can be translated into a mean opinion score (MOS) determination as set forth below:

For $R<0$: $MOS=1$ \quad (2)

For $R>100$: $MOS=4.5$

For $0<R<100$:
$MOS = 1 + 0.035 + 7.10^{-6} R(R-60)(100-R)$

Figure 8:
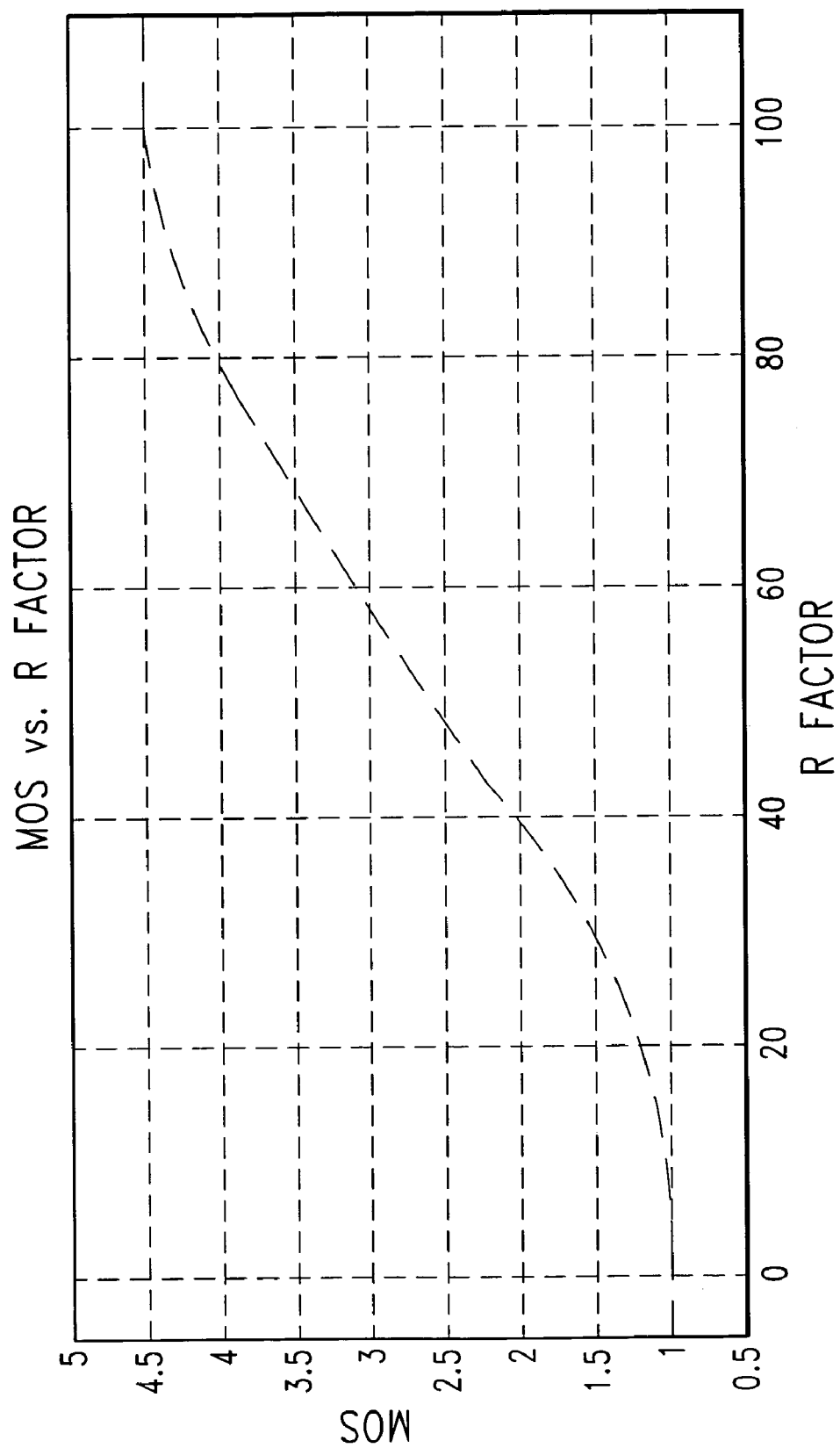
FIG. 8 is a mean opinion score (MOS) versus R-factor plot.

Referring to FIG. 7, the rating of voice quality and the corresponding R-Factor (R) and mean opinion score (MOS) scales are shown. Mean opinion score (MOS) versus R-Factor (R) values are plotted in FIG. 8.

For voice traffic, the R-Factor (R) is given the following equation:

$$R = 93.2 - (I_d + I_e) \quad (3)$$

Figure 9:
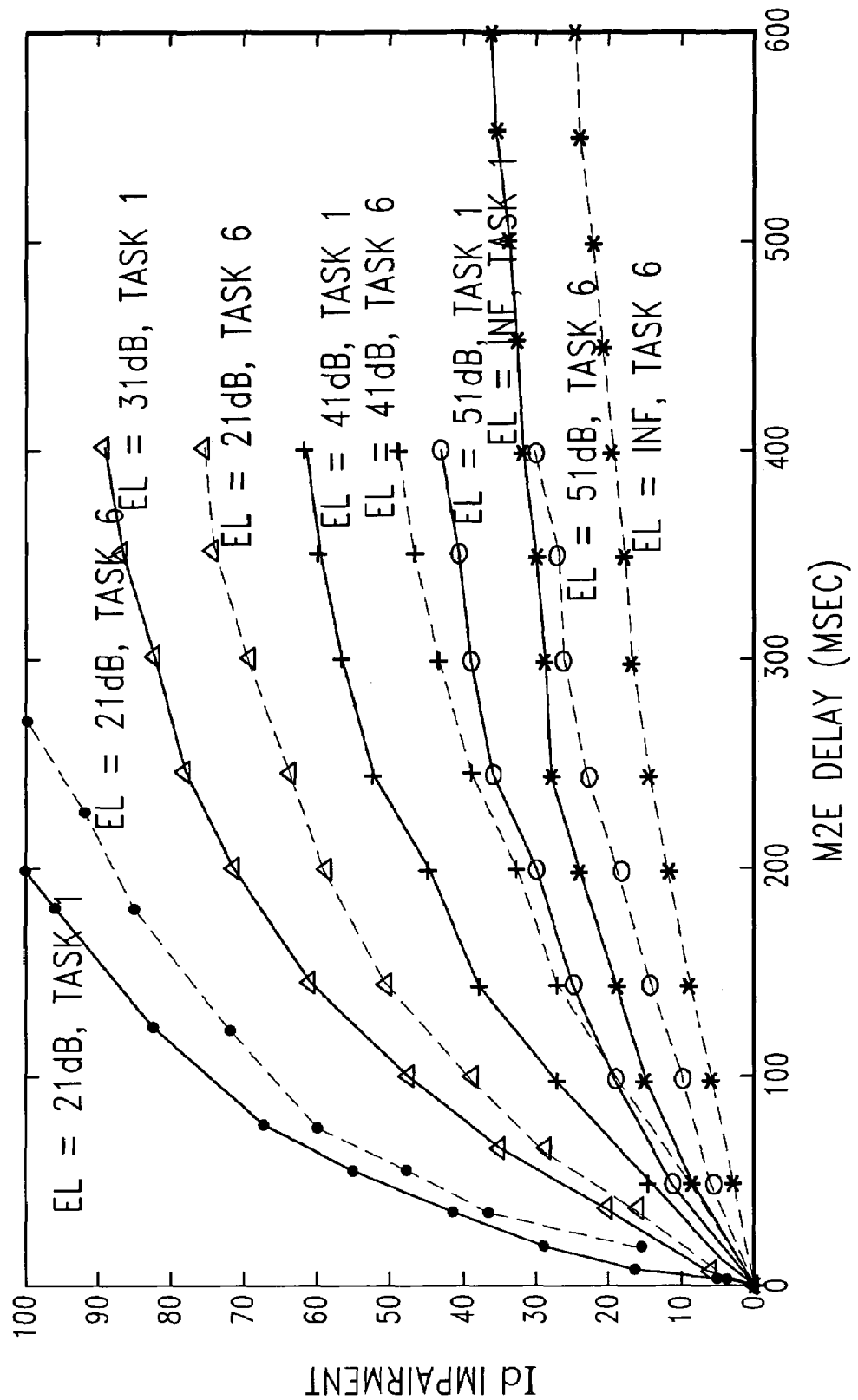
FIG. 9 is a plot of delay impairment versus mouth-to-ear delay.

The constant factor on right-hand side of equation (3) used to be 94.2 in previous versions of the standard. The mapping from end-to-end delay ($I_d$) is available for various types of voice conversations referred to as tasks and are defined in the art over a range (e.g., Task 1 and Task 6 are a business and casual conversation, respectively) and include Echo Loss (EL) factors. This mapping is shown in FIG. 9. Echo loss (EL) factors give a measure of the echo loss in dB at the points of reflection, so their value depends on an echo cancellation scheme.

The mapping from packet loss ($I_e$) is known for several types of speech codecs and packetization schemes. For the AMR speech codec, the effect of the signal distortion ($I_e$) versus frame erasure rate (FER) is shown on FIG. 10.

As set forth above, the Emodel shows that increasing delay leads to reducing the MOS value, but decreasing packet loss leads to increasing the mean opinion score (MOS). Therefore, an optimum mean opinion score (MOS) value must exist for a given set of conditions. The coding system finds the optimum source-channel coding resulting in the best mean opinion score (MOS) score. As a next step, the coding system is capable of determining the end-to-end delay as well as the packet loss rate after forward error correction (FEC).

The end-to-end delay has various components. First, the encoding delay, which consists of the sum of the frame size T (20 ms for AMR) and the look-ahead delay $I_a$ (which can consist of multiple processing delays at the transmission physical layer and the coder itself). Second, the packetization delay which accounts for the time it takes to group f frames together into one packet, i.e. $D_{pack}=(f-1)T$. The sum of the encoding delay and the packetization delay for k packets amounts to a formation time $T_f = kTf + I_a$. The processing delay for both the ACELP coder and the RS coder are assumed to be negligible.

The packets can then be transmitted on the access network 10, incurring transmission delay $T_h$, queuing delay $Q_h$, and propagation delay $P_h$ at each hop h in the path from the source terminal 102, 106 to the destination terminal 120, 122. If $B_h$ denotes the bandwidth at hop h, the total transmission delay is $$T_t = (n-k+1)(T f R_s + \Omega) \sum_h 1/B_h$$

where the source bit rate ($R_S$) represents the AMR bit rate before channel coding and $\Omega$ is the overhead in bits introduced by IP, UDP and RTP headers (typically 20, 8 and 12 bytes, respectively).

In calculating the transmission delay ($T_t$) above, the present invention asumes that the first k speech packets can be transmitted as soon as they are formed provided that copies are kept in a buffer for the computation of the (n-k) FEC packets. The transmission of each of the first (k-1) packets occurs in parallel to the formation time of the next packet so it does not contribute to the total transmission time $T_t$. The transmission time for the $k^{th}$ packet does however contribute to $T_t$. In addition, (n-k) FEC packets are formed right after all of the k speech packets are generated and are transmitted in sequence, thus contributing to $T_t$ (note that all n packets are of the same size under the FEC scheme set forth).

The propagation delay is negligible if within a local area; for intra-continental calls, the propagation delay is on the order of 30 ms and for inter-continental calls the delay can be as large as 100 ms. Upon reception, packets are usually delayed in a jitter buffer and the fixed playback delay must be at least the maximum queuing delay incurred in the network. The end-to-end delay can then be written as:

$$D = kTf + l_a + (n-k+1)(TfR_s + \Omega)\sum_h \frac{1}{B_h} + \sum_k (Q_h + P_h) + Q_{max} \quad (4)$$

It is to be noted that $B_h$ and $Q_h$ can be obtained from a QoS estimation measurement module. The effect of delay ($I_d$) can then be obtained by looking at FIG. 11.

Figure 11:
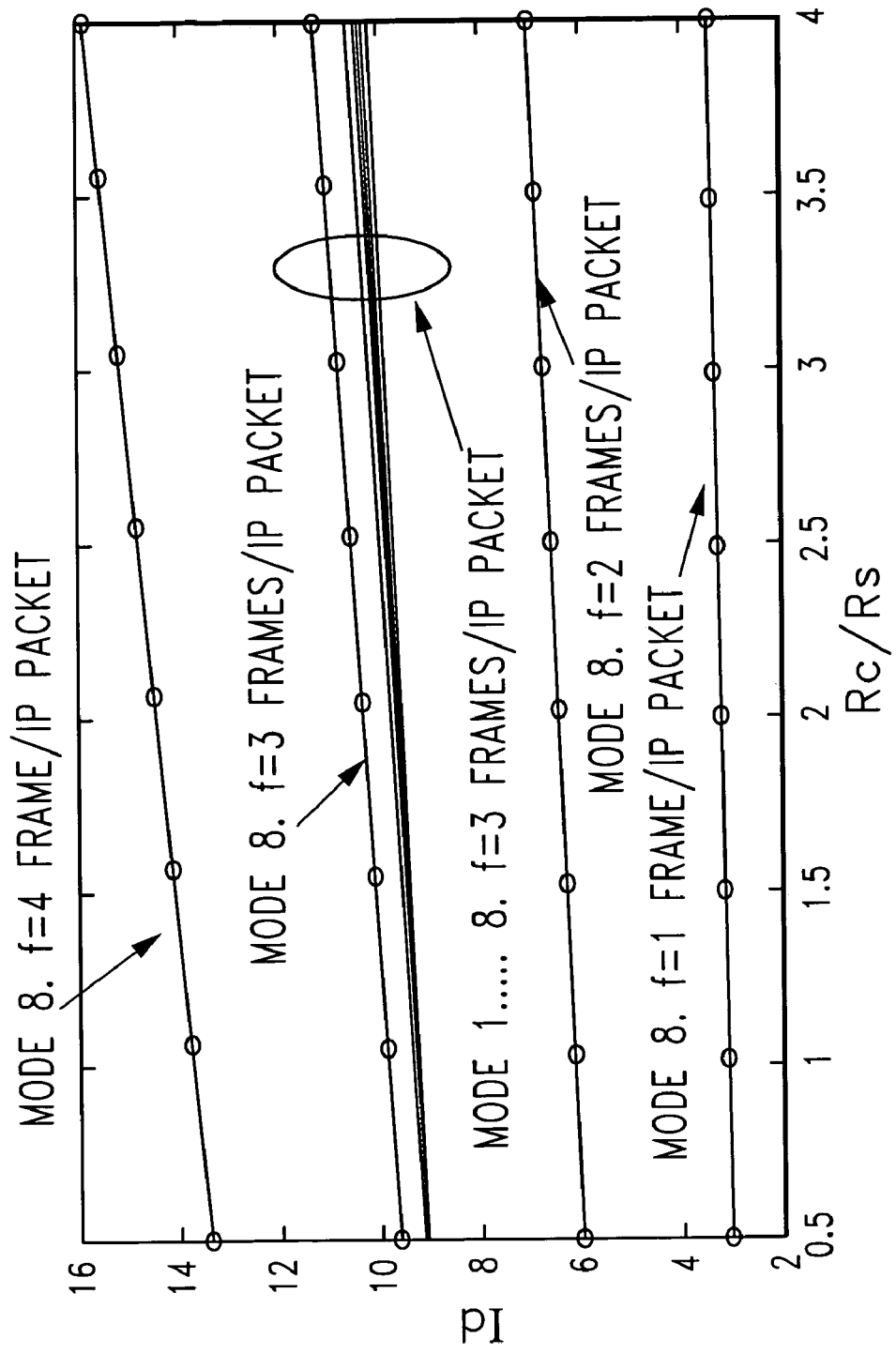
FIG. 11 is a plot of the effect of delay.

As an example, let us take k=2 and n=k, . . . , 10. Let us assume a 15-hop network path with one T1 line operating at 1.5 Mbps, 13 hops from the core network running at 622 Mbps, and one WLAN connection at 1 Mbps. Furthermore, let the queuing delay, propagation delay and playout buffer delay be zero. For each n/k value, the end-to-end delay (D) can then be computed and the corresponding effect of delay ($I_d$) factor can be found. This example is illustrated in FIG. 11 for different modes of the AMR source bit rate ($R_s$) and different number of frames per packet (f). The x-axis represents the amount of redundant information per media byte, that is $R_c/R_s = n/k-1$. FIG. 11 shows that the effect of delay ($I_d$) decreases with the source bit rate ($R_s$), but increases with the different number of frames per packet (f).

The adaptive bit rate algorithm module 208 obtains estimates for packet loss rates on the wired and wireless hops, $P_d$ and $p_s$ respectively, at the time an adaptation decision is being made. The QoS probing module 204 provides the packet loss rate on the wired hop ($p_d$) as well as the end-to-end packet loss rate denoted by ($p_s$), from which the packet loss rate on the wireless hop ($p_s$) can be derived.

The packet loss measurement on the wireless hop is made after FEC schemes try to recover errors. Assuming a random loss model on the wireless hop, one can relate the measured packet loss on the wireless hop $p_s$ to the parameters of the FEC scheme, namely n and k, and the "raw" packet loss rate on the wireless link $p_r$, i.e. what the packet loss would be in the absence of any correction scheme. Based on this information, the following equation can be written:

$$p_s = p_r\left(1 - \sum_{i=k}^{n-1}\binom{n-1}{i}(1-p_r)^i p_r^{n-1-i}\right) \quad (5)$$

where n is the total number of bytes per codeword and k the number of media bytes in the same codeword (i.e. n-k is the number of redundant bytes). Equation (5) shows that given the measurement $p_s$ and a (n, k) RS code, it is possible to deduce the current $p_r$. This value of $p_r$ is computed once per adaptation period and is used in the adaptation algorithm as shown in the next section.

Figure 10:
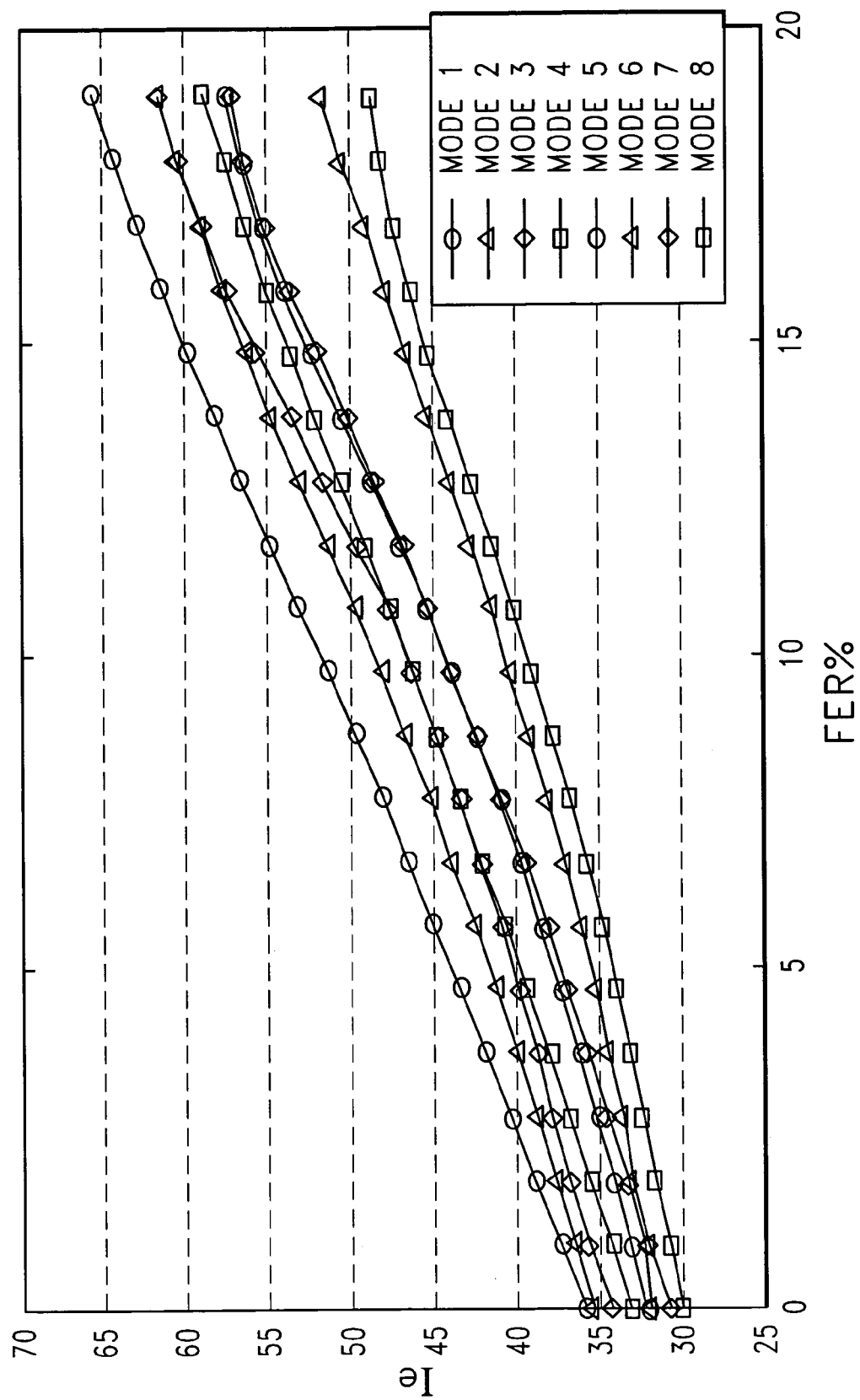
FIG. 10 is a plot of the effect of signal distortion versus the frame error rate (FER) for the eight mode of the adaptive multi-rate (AMR) coder.

FIG. 10 shows the effect of signal distortion ($I_e$) versus the frame error rate (FER), therefore the present invention relates the packet loss on the wireless hop ($p_s$) to the frame error rate (FER) after frame error correction (FEC). In percentage, the present invention results in the following:

$$FER = 100 \cdot p_s \quad (6)$$

Then, the effect of signal distortion ($I_e$) can be obtained by referring to FIG. 10.

The data for $I_e$ in FIG. 10 assumes random errors. One could argue that the statistical nature of packet loss after FEC is not random but bursty; this is because a failure to decode the block leads to a loss of kf speech frames. A more accurate approach is to use data such as in FIG. 1 for $I_e$ is to have multiple curves for each mode corresponding to different numbers of speech frames per packet as well as different burst lengths. This information is presently not available at this time. It is acknowledged that the limitation in using the data as is but the aim is to justify and illustrate the need for the adaptation process.

Figure 12:
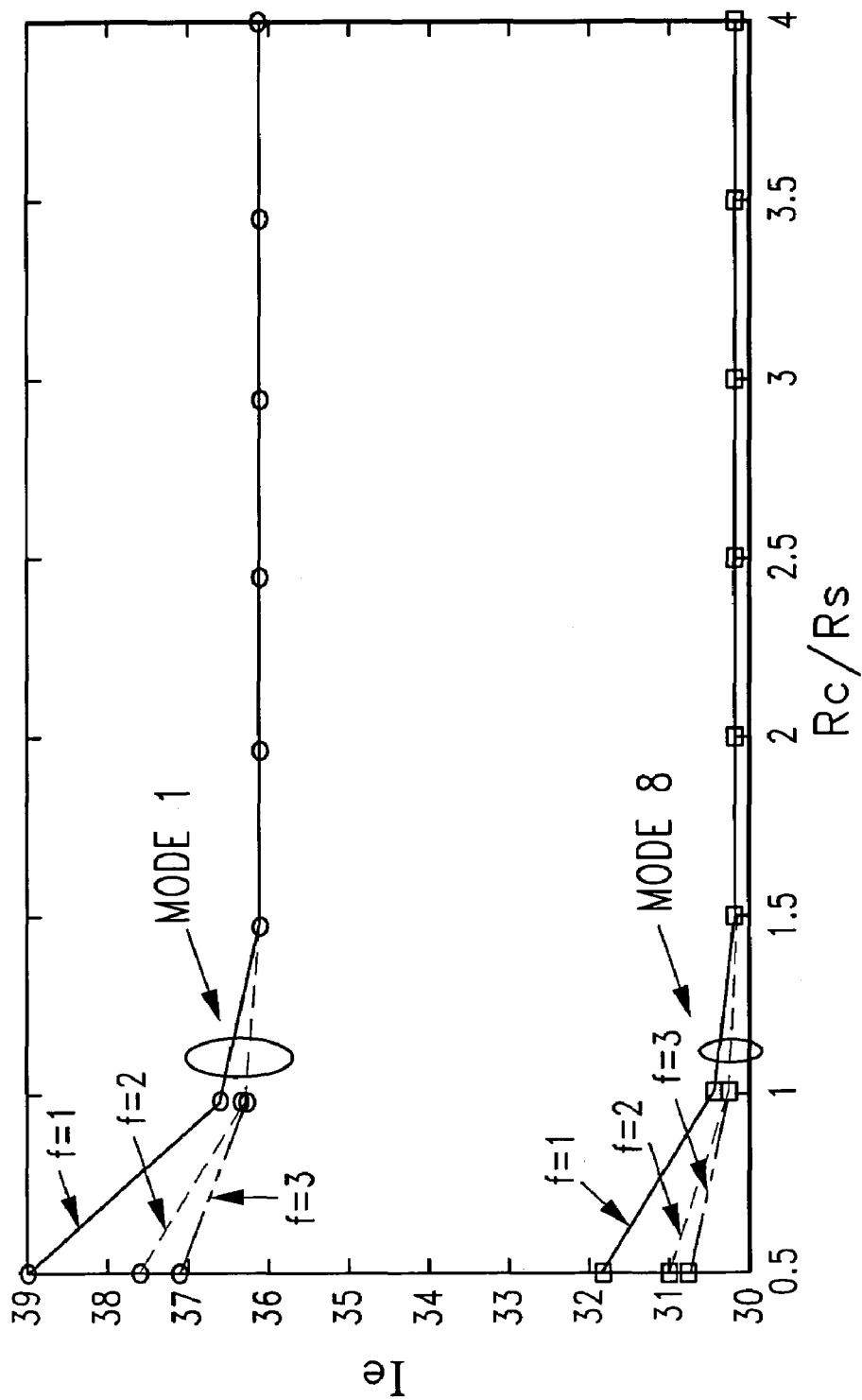
FIG. 12 illustrates a mean opinion score (MOS) for different transmission modes.

FIG. 12 shows the resulting mean opinion score (MOS) for the same example as before and with $p_r = 10\%$.

The preferred coding system 200 includes a bit rate adaptation algorithm module 208 that chooses appropriate source and channel bit rates given information on the available bandwidth and packet loss rates on the network path of interest. Given information on the available bandwidth (i.e., the maximum transmission rate that can be sustained by the network path such that congestion does not build up), and packet loss, the bit rate adaptation algorithm module 208 solves a bit allocation problem. The coding system 200 finds the optimum way of allocating source and channel bits such that the overall rate is less than the available bandwidth and the number of channel bits is adequate to result in desired speech quality given the packet loss rate (in effect, additional channel bits lead to a reduced packet loss since the code can recover from more errors). The tradeoff is as follows: increasing the number of channel bits makes the transmitted bits more robust to losses, but also decreases the goodput (i.e., the throughput of source bits) and increases the delay for source bits to arrive at the destination. The present coding system 200 analyzes this problem and finds the best possible combination of source and channel bit rates.

Figure 13:
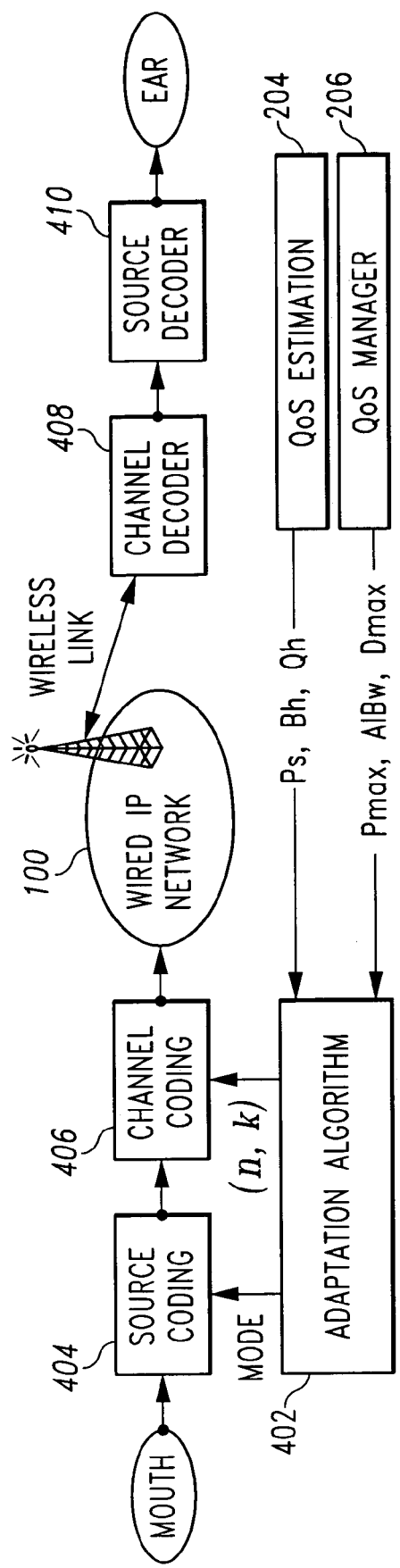
FIG. 13 illustrates a framework for VoIP and adaptation.

Referring to FIG. 13, the adaptive bit rate algorithm module 208 preferentially resides at the transmission end of the end-to-end path established by the access network 100, which could be a wireless terminal 102 or a fixed terminal 106. A quality of service (QoS) probing or estimation module 204 is also included that may provide estimates for packet loss and the path available bandwidth (AvBw). Although not specifically illustrated, a quality of service (QoS) management module 206 may also be included that is capable of providing information, which is an input to the algorithm, on the constraints that are placed on the continuous voice stream transmission by either the access network operator, the source terminal 102, 106 or any other party to the access network 100. The quality of service (QoS) probing module 204 and the quality of service (QoS) management module 206 may be located on any network device and pass data to the terminal 102, 106.

The source terminals 102, 106 may also include a source coding module 404 and a channel coding module 406 that are responsible for controlling the adaptive multi-rate coder 202 as dictated by the adaptive bit rate algorithm module 208. The destination terminals 120, 122 may include a channel decoder 408 and a source decoder 410 that are responsible for reproducing the speech signals that are contained in the continuous voice stream transmission from the source terminal 102, 106.

The inputs to the source and channel rate adaptation algorithm in the adaptive bit rate algorithm module 208 are preferentially: 1) QoS information: Wireless hop packet loss $p_s$, path bandwidth ($B_h$) and congestion ($Q_h$), and 2) QoS constraints: Maximum end-to-end delay $D_{max}$, maximum allowed bandwidth AlBw, minimum goodput $G_{min}$, and maximum permitted packet loss $p_{max}$. The output will be a decision on the choice of $R_s$ and $R_c$, the source and channel bit rates respectively.

The adaptive bit rate algorithm module 208 determines the values of n and k such that the mean opinion score (MOS) is maximum, but subject to constraints on delay ($D_{max}$), allowed bandwidth (AlBw), goodput ($G_{min}$) and packet loss $p_{max}$.

The present invention starts by setting the following constraint:

$$AlBw \geq \frac{n}{k} R_s \qquad (7)$$

where AlBw is the allowed bandwidth provided as a constraint input to the adaptation algorithm and $nR_s/k$ represents the total bit rate (source and channel bits included).

Now the source code rate ($R_s$) can only take on values from among 8 possible rates: 4.75, 5.15, 5.90, 6.70, 7.40, 7.95, 10.2 and 12.2 kbps. It should be noted that 9 different rates are possible in wideband AMR. The bit rate adaptation algorithm module starts by picking the lowest value of 4.75 kbps for the source code rate ($R_s$). In the present invention, the values of k and n are varied over the ranges k=1, ..., $k_{max}$ and n=k, ..., near. Note that n=k corresponds to the case without FEC. Parameter $k_{max}$ is such that the delay (D) given by equation (4) is bounded by a maximum value ($D_{max}$) beyond which voice quality becomes unacceptable (150-200 ms). Using equation (4) and equation (7):

$$k_{max} = \frac{D_{max} - l_a - \sum_h (Q_h + P_h) - Q_{max} - (TfR_s + \Omega) \sum_h \frac{1}{B_h}}{Tf + (AlBw - R_s)\left(Tf + \frac{\Omega}{R_s}\right) \sum_h \frac{1}{B_h}} \qquad (8)$$

Further, $n_{max}$ is defined as:

$$n_{max} = \min\left\{\frac{AvBw \times k}{R_s}, n^*, n'\right\} \qquad (9)$$

where n* is the size of the RS code for which packet loss $p_s$ after FEC goes below $p_{max}$; and n' is defined by:

$$\frac{k}{n} \geq G_{min} \Rightarrow n \leq \frac{k}{G_{min}} \Rightarrow n' = \frac{k}{G_{min}} \qquad (10)$$

where $G_{min}$ is the minimum goodput required by the application. The values for n* and n' are recomputed for every value of k.

For each (n, k) pair, the present invention obtains a value for D using equation (4) and this is mapped into a value for the effect of delay ($I_d$) using the data from FIG. 9. Now, given the measured value of packet loss on the wireless hop ($p_s$), the previous settings for the source code rate ($R_s$) and the channel code rate parameters n and k, the raw packet loss on the wireless link ($p_s$) is calculated using equation (5). Since no closed form solution is available to express the raw packet loss on the wireless link ($p_r$) as a function of the measured value of packet loss on the wireless hop ($p_s$) this step requires computing a table off-line to relate these two values such that finding the raw packet loss on the wireless link ($p_r$) in this case becomes possible with a table lookup operation. The currently considered selection of n and k combined with the calculated value of the raw packet loss on the wireless link ($p_r$) allows computation of the packet loss value on the wireless hop ($p_s$) using equation (5) again. Finally, the computed value of packet loss on the wireless hop ($p_s$) is used to obtain the frame erasure rate (FER) using equation (6), which, in turn, is mapped into a value for the effect of signal distortion ($I_e$) using the data from FIG. 10.

At this stage, values for both the effect of delay ($I_d$) and the effect of signal distortion ($I_e$) have been obtained, which correspond to a chosen tuple (n, k) and a source rate $R_s$. Once these values have been determined, the value of the R-Factor (R) may be obtained using equation (3), and then, the value of the mean-opinion-score (MOS) may be determined using equation (2). The process described above is repeated for all possible values of the source code rate ($R_s$). After this is accomplished, the bit rate adaptation algorithm module chooses the combination of the source code rate ($R_s$) and the channel code rate ($R_c$) that gives the maximum mean opinion score (MOS).

Further refinements of the algorithm take into account the various possible outcomes of the process. In one instance, a subset of ($R_s$, $R_c$) combinations may be optimum in that the MOS score corresponding to each combination may be very close to the highest MOS score. The term "very close" means that the absolute difference between each of these optima and the highest MOS is less than or equal to 0.2; in terms of user perception, such a difference in MOS is not noticeable. In this case, instead of choosing the ($R_s$, $R_c$) combination with the highest MOS, the present invention picks the pair from this subset that leads to the lowest total bandwidth utilization ($R_s+R_c$).

In another instance, a solution may not exist. In that case, the present invention does not use channel coding and picks the highest AMR mode that does not violate the allowed bandwidth constraint.

The bit rate adaptation algorithm module described above consists of an exhaustive search over a relatively small set of values. The number of modes for the AMR codec is typically 8 (9 for wideband AMR) and n and k are typically less than 20 or 25 at most. This means the algorithm requires relatively few computational operations to complete making it suitable for real-time and dynamic adaptation as the voice over IP communication progresses.

In the following discussion, the following assumptions are made about the setup of the IP access network 100 and voice environment:

f=1,
The path consists of 15 hops of which 13 are fast core network links of 622 Mbps, and 2 are edge links at 1.5 Mbps and 1 Mbps,
$Q_{max}$=20 msec,
Network protocols involved are IP, UDP and RTP introducing a total header overhead of $\Omega$=40 bytes.
In FIG. 9, it is assumed task 6 (free conversation) with an infinite Echo Loss (EL=∞)
$D_{max}$=200 msec.
$P_h$=0.06 msec/hop.
$Q_h$ is random between 0 and 1 msec.
$G_{min}$ is ignored.
$p_{max}$=10$^{-4}$.

The plots in FIG. 12 illustrate the existence of an optimum value for $R_c/R_s$ resulting in a peak value for mean opinion score (MOS). This goes back to the discussion where a tradeoff results from varying the forward error correction (FEC), namely because more redundancy leads to lower packet loss, hence the lower the effect of signal distortion ($I_e$), but causing concurrently an increase in delay which results in a higher value for the effect of delay ($I_d$). The tradeoff is, therefore, on the sum ($I_d+I_e$). An additional fact to observe is that a higher source rate always outperforms lower rates (i.e. AMR modes). In such a case, one would argue for the selection of the highest AMR mode at all times. However, FIG. 12 ignores the constraint on allowed bandwidth. The present invention, therefore, maximizes perceived quality (i.e., mean opinion score (MOS)) by satisfying constraints on delay ($D_{max}$), allowed bandwidth (AlBw), packet loss $p_{max}$ and goodput $G_{min}$. Further investigation in light of these constraints is shown in FIGS. 15 and 16.

Figure 14:
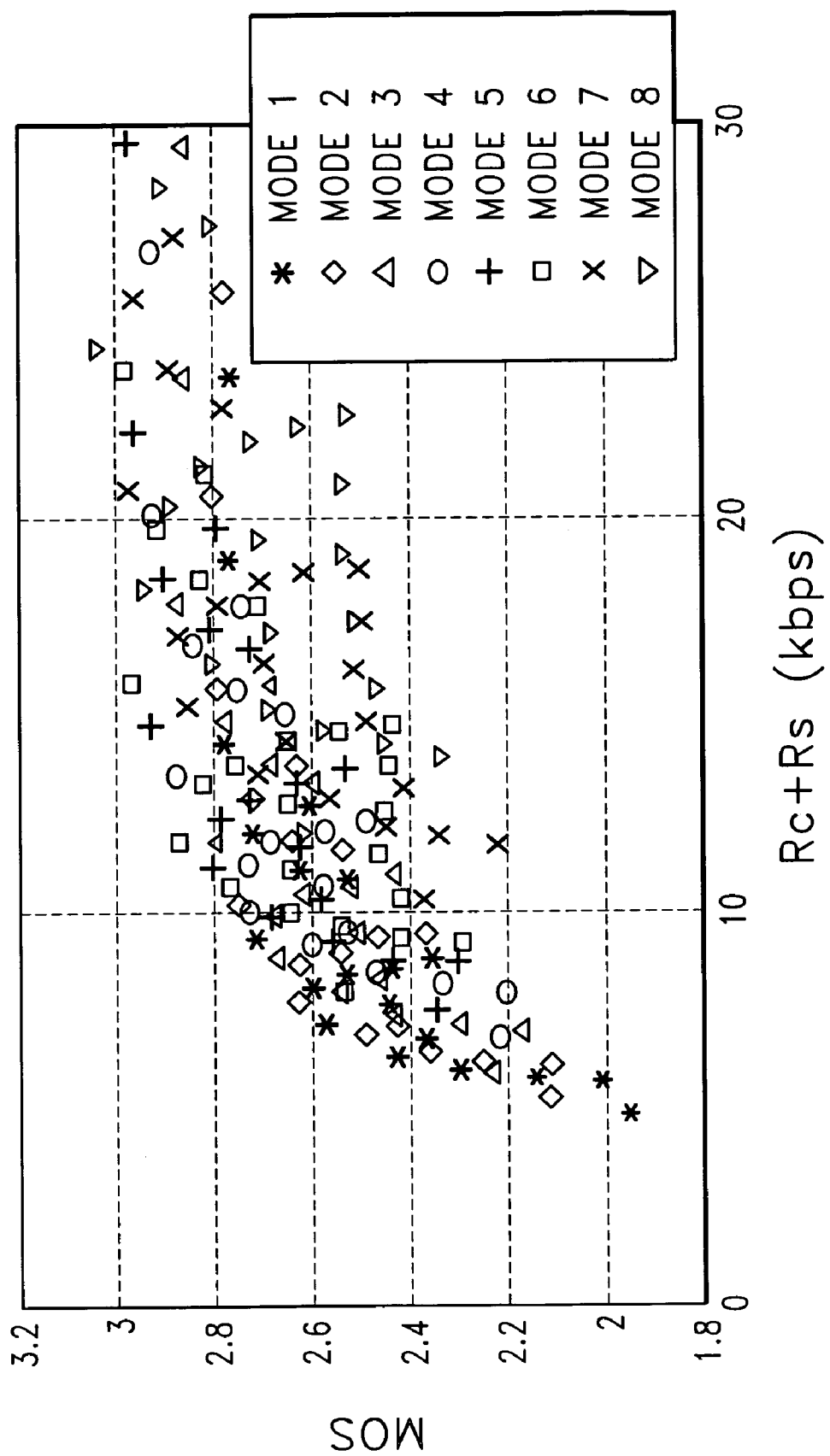
FIG. 14 illustrates a mean opinion score (MOS) plot for every mode versus total bandwidth at 10% packet loss rate.

The result in FIG. 14 illustrates that it is possible to obtain several solutions that are close in terms of achieved mean opinion score (MOS), but have a high difference in terms of required total bandwidth. In such a case, it may not be suitable to choose the optimum point (i.e., that gives highest mean opinion score (MOS)), but rather the closest solution to the to optimum within about 0.1 different in mean opinion score (MOS) value; this is because such a difference is hardly noticeable by the human ear. This situation illustrates step 2 of the algorithm (e.g. points A and C in FIG. 15 where a 0.1 degradation in MOS corresponds to sparing 25 kbps of bandwidth).

Figure 15:
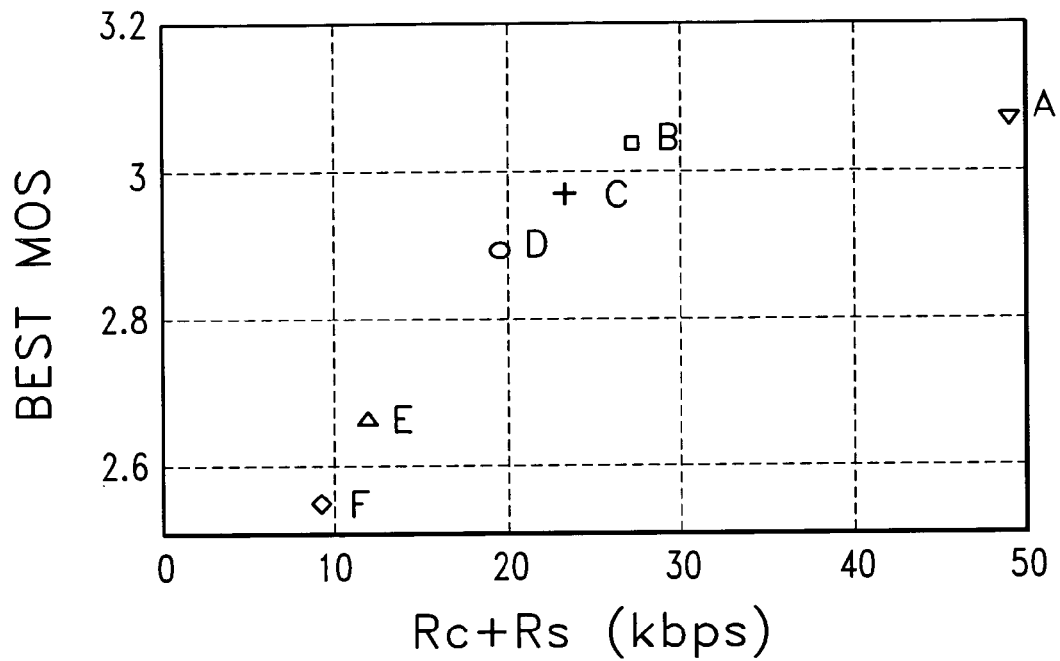
FIG. 15 illustrates a plot of the best possible mean opinion score (MOS) among all modes versus available bandwidth at 20% packet loss rates.
Figure 16:
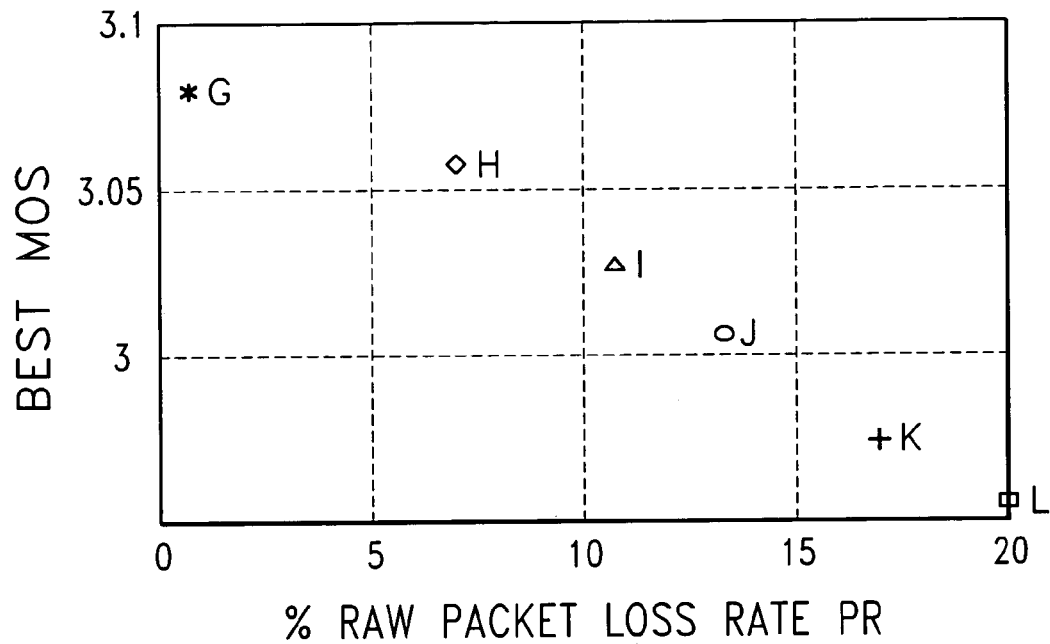
FIG. 16 illustrates the best possible mean opinion score (MOS) among all modes versus a percentage of packet loss rate.

FIG. 15 illustrates the best MOS score for different allowed bandwidth constraints and a fixed raw packet loss rate ($p_r$=20%). FIG. 16 shows the best MOS score for different raw packet loss rates and a fixed allowed bandwidth (AlBw=26 kbps). FIGS. 15 and 16 indicate n, k, the selected mode, and values for $I_d$ and $I_e$ for each point on the plots. It can be shown that mode 8, k=1 and n=2 is the best solution up to $p_r \approx 15\%$ (points G-J). This stems from the fact that mode 8 is inherently more resilient to losses than lower modes; moreover, using only one media packet to generate one FEC packet minimizes the delay. For a very noisy channel ($p_r$>15%) and the same allowed bandwidth, switching to a lower mode and adding more FEC is the best option (points K and L).

As set forth in detail above, the present invention discloses an adaptation algorithm of source and channel coding rates to QoS conditions in wireless IP networks using the AMR speech codec and Reed-Solomon codes. The metric used for optimization is the mean opinion score (MOS) as defined by the ITU-T Emodel for voice traffic. The present invention shows that for noisy links and given QoS constraints it is necessary to sacrifice source bits for increased robustness to packet loss. Moreover, the present invention acknowledges the fact that while FEC mitigates the effects of packet loss, it also increases the end-to-end delay. These two trends work opposite to each other, the first causing an increase and the second a decrease in voice quality. The algorithm finds the optimum compromise between packet loss recovery and end-to-end delay to maximize perceived voice quality.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A terminal having an adaptive coding system, comprising:
    a multi-rate adaptive coder capable of transmitting a continuous voice stream transmission at a source code bit rate and a channel code bit rate;
    a quality of service probing module for probing an end-to-end network path of the continuous voice stream transmission to obtain at least one quality of service parameter;
    a quality of service management module for determining at least one constraint associated with the continuous voice stream transmission; and
    an adaptive bit rate algorithm module for dynamically adjusting the source code bit rate and the channel code bit rate as a function of the quality of service parameter and the constraint to obtain a maximum value of perceived user performance during the continuous voice stream transmission.

2. The terminal of claim 1, where the adaptive bit rate algorithm module computes a maximum number of media symbols in a codeword ($k_{max}$), a maximum length of the codeword ($n_{max}$), an end-to-end network delay (D), a delay impairment factor ($I_d$), a measured packet loss factor, a signal distortion factor ($I_e$) and an R-Factor (R) to calculate a mean opinion score (MOS) that is used to adjust the source code bit rate and the channel code bit rate.

3. The terminal of claim 2, where the mean opinion score (MOS) is determined for a plurality of code bit rate values.

4. The terminal of claim 1, where a mean opinion score (MOS) is used to set the source code bit rate and the channel code bit rate.

5. The terminal of claim 2, where the maximum number of media symbols in the codeword ($k_{max}$) is computed such that $$k_{max} = \frac{D_{max} - l_a - \sum_h (Q_h + P_h) - Q_{max} - (TfR_s + \Omega)\sum_h \frac{1}{B_h}}{Tf + (AlBw - R_s)\left(Tf + \frac{\Omega}{R_s}\right)\sum_h \frac{1}{B_h}}.$$

6. The terminal of claim 2, where the maximum length of the codeword ($n_{max}$) is computed such that $$n_{max} = \min\left\{\frac{AvBw \times k}{R_s}, n^*, n'\right\}.$$

7. The terminal of claim 2, where the end-to-end network delay (D) is computed such that $$D = kTf + l_a + (n - k + 1)(TfR_s + \Omega)\sum_{hops} \frac{1}{B_h} + \sum_{hops}(Q_h + P_h) + Q_{max}.$$

8. The terminal of claim 2, where the delay impairment factor ($I_d$) is computed using a stored look-up table.

9. The terminal of claim 2, where the measured packet loss factor is based on a wireless link.

10. The terminal of claim 9, where the measured packet loss factor for the wireless link is determined such that $$p_s = p_r\left(1 - \sum_{i=k}^{n-1}\binom{n-1}{i}(1 - p_r)^i p_r^{n-1-i}\right).$$

11. The terminal of claim 2, where the signal distortion factor ($I_e$) is determined using a look-up table.

12. The terminal of claim 2, where the R-factor (R) is determined such that $R=93.2-I_d-I_e$.

13. The terminal of claim 2, where the mean opinion score (MOS) equals $1+0.035+7.10^{-6}R(R-60)(100-R)$.

14. The terminal of claim 1, where the quality of service parameter comprises a packet loss rate.

15. The terminal of claim 1, where the quality of service parameter comprises an available bandwidth.

16. The terminal of claim 1, where the constraint comprises an allowed bandwidth for the continuous voice stream transmission.

17. The terminal of claim 1, where the constraint comprises a maximum allowed delay for the continuous voice stream transmission.

18. The terminal of claim 1, where the constraint comprises a maximum packet loss rate for the continuous voice stream transmission.

19. A method of providing adaptive coder rates to a terminal using an access network, comprising the steps of:
providing a multi-rate adaptive coder capable of transmitting a continuous voice stream transmission that has a source code bit rate and a channel code bit rate;
probing an end-to-end network path of the voice stream transmission to obtain at least one quality of service parameter;
determining at least one constraint associated with the continuous voice stream transmission; and
adapting the source code bit rate and the channel code bit rate as a function of the quality of service parameter and the constraint to obtain a maximum value of perceived user performance during the continuous voice stream transmission.

20. The method of claim 19, where an adaptive bit rate algorithm module is used to adapt the source code bit rate and the channel code bit rate.

21. The method of claim 20, where the adaptive bit rate algorithm module computes a maximum number of media symbols in a codeword ($k_{max}$), a maximum length of the codeword ($n_{max}$), an end-to-end network delay (D), a delay impairment factor ($I_d$), a measured packet loss factor, a signal distortion factor ($I_e$) and an R-Factor (R) to calculate a mean opinion score (MOS) that is used to adjust the source code bit rate and the channel code bit rate.

22. The method of claim 21, where the mean opinion score (MOS) is determined for a plurality of code bit rate values.

23. The method of claim 22, where the code bit rate value that achieves the highest qualitative value for the mean opinion score (MOS) is selected by the adaptive bit rate algorithm module.

24. The method of claim 19, where a mean opinion score (MOS) is used to set the source code bit rate and the channel code bit rate.

25. The method of claim 21, where the maximum number of media symbols in the codeword ($k_{max}$) is computed such that $$k_{max} = \frac{D_{max} - l_a - \sum_h (Q_h + P_h) - Q_{max} - (TfR_s + \Omega)\sum_h \frac{1}{B_h}}{Tf + (AlBw - R_s)\left(Tf + \frac{\Omega}{R_s}\right)\sum_h \frac{1}{B_h}}.$$

26. The method of claim 21, where the maximum length of the codeword ($n_{max}$) is computed such that $$n_{max} = \min\left\{\frac{AvBw \times k}{R_s}, n^*, n'\right\}.$$

27. The method of claim 21, where the end-to-end network delay (D) is computed such that $$D = kTf + l_a + (n-k+1)(TfR_s + \Omega)\sum_{hops}\frac{1}{B_h} + \sum_{hops}(Q_h + P_h) + Q_{max}.$$

28. The method of claim 21, where the delay impairment factor ($I_d$) is computed using a stored look-up table.

29. The method of claim 19, where the measured packet loss factor is based on a wireless link.

30. The method of claim 29, where the measured packet loss factor for the wireless link is determined such that $$p_s = p_r(1 - \sum_{i=k}^{n-1}\binom{n-1}{i}(1-p_r)^i p_r^{n-1-i}).$$

31. The method of claim 21, where the signal distortion factor ($I_e$) is determined using a look-up table.

32. The method of claim 21, where the R-factor (R) is determined such that $R=93.2-I_d-I_e$.

33. The method of claim 21, where the mean opinion score (MOS) equals $1+0.035+7.10^{-6}R(R-60)(100-R)$.

34. The method of claim 19, where the quality of service parameter comprises a delay.

35. The method of claim 19, where the quality of service parameter comprises a packet loss rate.

36. The method of claim 19, where the quality of service parameter comprises an available bandwidth.

37. The method of claim 19, where the constraint comprises an allowed bandwidth for the continuous voice stream transmission.

38. The method of claim 19, where the constraint comprises a maximum allowed delay for the continuous voice stream transmission.

39. The method of claim 19, where the constraint comprises a maximum packet loss rate for the continuous voice stream transmission.

40. A terminal having an adaptive coding system, comprising:
means for transmitting a continuous voice stream transmission that includes a source code bit rate and a channel code bit rate;
means for probing an end-to-end network path of the continuous voice stream transmission to obtain at least one quality of service parameter;
means for determining at least one constraint associated with the continuous voice stream transmission; and
means for adjusting the source code bit rate and the channel code bit rate as a function of the quality of service parameter and the constraint to obtain a maximum value of perceived user performance during the continuous voice stream transmission.

41. The terminal of claim 40, where an adaptive bit rate algorithm module computes a maximum number of media symbols in a codeword ($k_{max}$), a maximum length of the codeword ($n_{max}$), an end-to-end network delay (D), a delay impairment factor ($I_d$), a measured packet loss factor, a signal distortion factor ($I_e$) and an R-Factor (R) to calculate a mean opinion score (MOS) that is used to adjust the source code bit rate and the channel code bit rate.

42. The terminal of claim 41, where the mean opinion score (MOS) is determined for a plurality of code bit rate values.

43. The terminal of claim 42, where a mean opinion score (MOS) is used to set the source code bit rate and the channel code bit rate.

44. A method of jointly adapting a codec source rate and a forward error correction (FEC) channel rate to optimize perceived user quality, comprising the steps of:
   probing an end-to-end path to identify at least one quality of service (QoS) parameter for a voice stream transmission;
   querying a quality of service (QoS) manager to identify at least one quality of service (QoS) constraint for the voice stream transmission;
   processing the quality of service (QoS) parameter to produce at least one QoS estimate for the voice stream transmission;
   processing the quality of service constraint (QoS) to produce at least one QoS constraint on a selection of source and channel code bit rates.
   exploring different combinations of codec source rates and forward error correction (FEC) channel rates to produce at least one speech quality estimate; and
   choosing at least one combination of a respective codec source rate and a respective forward error correction (FEC) channel rate that maximizes perceived user quality.

45. The method of claim 44, where the probing step is performed by at least one computing device that may be selected from a group of computing devices consisting of a source node, a router, and a destination node.

46. The method of claim 44, where the querying step is performed by at least one computing device that may be selected from a group of computing devices consisting of a source node, a router, and a destination node.

47. The method of claim 44, where the processing step is performed by at least one computing device that may be selected from a group of computing devices consisting of a source node and a destination node.

48. The method of claim 44, where the exploring step is performed by at least one computing device that may be selected from a group of computing devices consisting of a source node and a destination node.

49. The method of claim 44, where the choosing step is performed by at least one computing device that may be selected from a group of computing devices consisting of a source node and a destination node.

50. The method of claim 44, where the quality of service (QoS) parameter comprises a packet loss rate.

51. The method of claim 44, where the quality of service (QoS) parameter comprises an available bandwidth.

52. The method of claim 44, where the constraint comprises an allowed bandwidth for the voice stream transmission.

53. The method of claim 44, where the constraint comprises a maximum allowed delay for the voice stream transmission.

54. The method of claim 44, where the constraint comprises a maximum required packet loss rate for voice stream transmission.

55. The method of claim 44, where the speech quality estimate comprises a mean opinion score (MOS).

56. The method of claim 44, where the perceived user quality is based on a ITU-T Emodel.

57. The method of claim 44, where the exploring step includes estimating at least one MOS score for at least one combination of the codec source rate and the forward error correction (FEC) channel rate.

58. The method of claim 57, where the quality of service (QoS) estimate is used to obtain at least one said MOS score.

59. The method of claim 57, further comprising the step of limiting the search on a number of media packets in a forward error correction (FEC) code in accordance with a delay constraint.

60. The method of claim 57, further comprising the step of limiting the search on a number of redundancy packets in a forward error correction (FEC) code in accordance with an allowed bandwidth constraint.

61. The method of claim 57, further comprising the step of limiting the search on a number of redundancy packets in a forward error correction (FEC) code in accordance with a goodput constraint.

62. The method of claim 57, further comprising the step of limiting the search on a number of redundancy packets a forward error correction (FEC) code in accordance with a maximum required packet loss constraint.

63. The method of claim 57, further comprising the step of estimating at least one delay value for at least one combination of the source rate and the forward error correction (FEC) channel rate.

64. The method of claim 63, further comprising the step of estimating at least one speech impairment factor for at least one combination of the source rate and the forward error correction (FEC) channel rate.

65. The method of claim 63, where the speech impairment factor comprises one parameter of an Emodel.

66. The method of claim 57, further comprising the step of estimating at least one packet loss rate value for at least one combination of the source rate and the forward error correction (FEC) channel rate.

67. The method of claim 66, further comprising the step of estimating at least one speech impairment factor for at least one combination of the source rate and the forward error correction (FEC) channel rate.

68. The method of claim 67, where the speech impairment factor comprises at least one parameter of an Emodel.

69. The method of claims 65 or 68, further comprising the step of estimating at least one speech quality metric.

70. The method of claim 69, where the speech quality metric may be selected from a group of speech quality metrics including an ITU-T Emodel R-Factor and a mean opinion score (MOS).

71. The method of claim 44, where the choosing step includes selecting at least one source rate and forward error correction (FEC) channel rate combination corresponding to a maximum speech quality.

72. The method of claim 71, where the maximum speech quality is defined by an ITU-T Emodel R-Factor.

73. The method of claim 71, where the maximum speech quality is defined by a mean opinion score (MOS).

74. The method of claim 44, wherein said choosing step includes selecting at least one source rate and forward error correction (FEC) channel rate combination corresponding to a speech quality with a factor of magnitude of a maximum speech quality achievable under the constraints.

75. The method of claim 74, where the speech quality is defined by an ITU-T Emodel R-Factor.

76. The method of claim 74, the speech quality is defined by a mean opinion score (MOS).

77. The method of claim 74, wherein the factor of magnitude is a minimum Human perceived speech quality difference.

78. The method of claim 44, where the choosing step includes selecting at least one source rate corresponding to a maximum allowed rate achievable under the constraints.

* * * * *